United States Patent [19]
Brandenstein

[11] 3,989,129
[45] Nov. 2, 1976

[54] MODULATED ELECTRIC SLIP CLUTCH

[75] Inventor: Zane G. Brandenstein, Orange, Conn.

[73] Assignee: Emerson Electric Co., St. Louis, Mo.

[22] Filed: Feb. 20, 1975

[21] Appl. No.: 551,077

[52] U.S. Cl. .............................. 192/84 R; 192/52; 192/103 R; 192/.02 R
[51] Int. Cl.² ...................................... F16D 27/04
[58] Field of Search ................. 192/52, 84 R, 109 R

[56] References Cited
UNITED STATES PATENTS

| | | | |
|---|---|---|---|
| 2,664,782 | 1/1954 | Weninger | 192/84 R X |
| 2,695,695 | 11/1954 | Gilfillan et al. | 192/84 R X |
| 2,718,951 | 9/1955 | Mason | 192/84 R X |
| 2,880,595 | 4/1959 | McGuffey et al. | 192/109 R X |
| 3,695,406 | 10/1972 | Graham et al. | 192/107 M |

*Primary Examiner*—Benjamin W. Wyche
*Attorney, Agent, or Firm*—Polster and Polster

[57] ABSTRACT

A dynamoelectric machine drive system capable of starting a second, driven unit in a slow, nondisruptive manner is provided which utilizes an electromechanical clutch between the dynamoelectric machine system and the second, driven unit. The clutch includes first and second members having a clutch face arranged in abutting relationship. The clutch face of one of the first and second members is constructed from a material having a relatively low coefficient of friction. During start, the clutch mating surfaces permit relative rotational movement between the first and second members. Means for controlling the application of electrical energy to the electromechanical clutch includes means for applying a first voltage to the clutch during start-up of the dynamoelectric machine, and means for automatically applying a second, higher voltage as the driven unit comes to operational speed.

6 Claims, 5 Drawing Figures

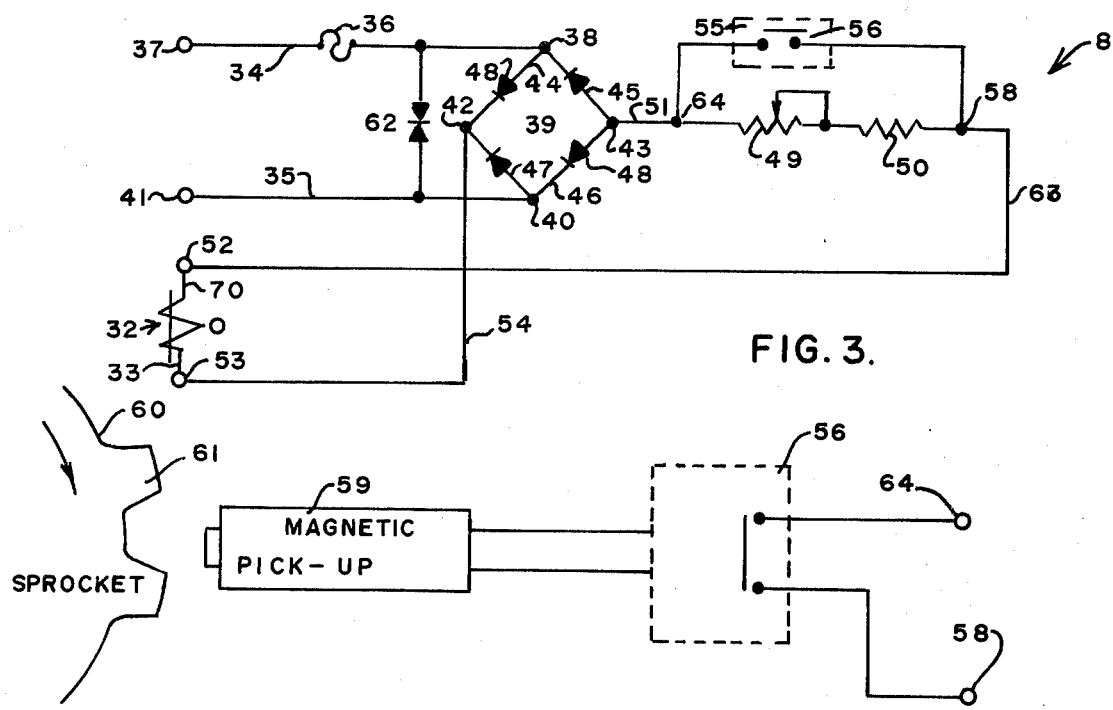
FIG. 3.
FIG. 4.
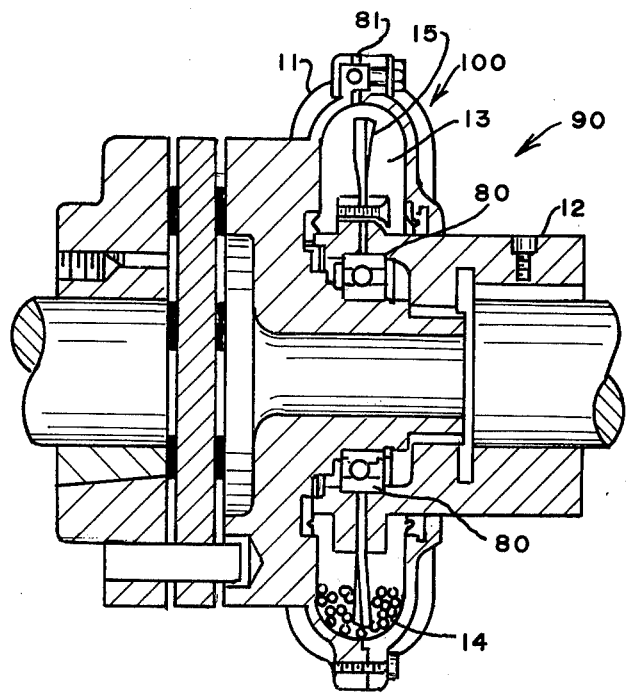
FIG. 5.
(PRIOR ART)

MODULATED ELECTRIC SLIP CLUTCH

BACKGROUND OF THE INVENTION

This invention relates to drive units, and in particular, to electrical drives having soft starting characteristics. While the invention is described in particular detail with respect to its application as a drive unit for post office conveyors, those skilled in the art will recognize the wider applicability of the inventive principals and structure disclosed hereinafter.

In this specification, the term "soft start drive" is used to indicate a drive system for a driven unit which enables the driven unit to come up to operating speed at a rate slower than the rate at which the driving member, conventionally an electric motor, comes to speed. Such drives find application, for example, in conveyor systems, in large blower units and other apparatus having high inertia during start-up.

The particular factual background from which the present invention was derived deals with conveyor drives. It is common, in many conveyor applications, to use constant speed motors, of ½ horsepower and larger, to drive the conveyor system. Constant speed motors generally are less costly to purchase than variable speed motors, also known in the art, particularly if additional low cost soft start mechanisms can be used with them. Thus, various post office installations have opted to utilize electrically powered conveyors driven by constant speed motors for carrying the mail through the post office facility during processing. This type of application has a varying load factor in that the amount of mail processed in certain periods of the work year, for example, during the Christmas season, is substantially higher than other periods. In general, the post office applications require motor systems for driving the conveyor which are powerful enough to handle the peak load condition. This means the drive system is too powerful for a large portion of the remaining operational time periods of the conveyor.

To overcome these difficulties, it heretofore has been the practice to provide a dry fluid drive between the motor and a gear system which is connected to the conveyor. The dry fluid drive conventionally included a chamber which contains a plurality of steel shot. A system illustrating this form of dry fluid drive is shown in FIG. 5 of the drawings, and has been labeled prior art. It may be observed, in FIG. 5, that a plurality of vanes are arranged in a chamber defined by the enclosure of the dry fluid drive. The vanes function to engage the shot load and compress it as the motor begins to come to speed. The time required to compress the shot load enables the conveyor to accelerate at a slower rate than the drive motor, and supposedly provides the desired soft start characteristic for the system.

While dry fluid drives work well for their intended purposes in theory, they have exhibited a number of deficiencies in applicational use. First, the shot load in this type of drive must be adjusted to compensate for conveyor loading. Because most conveyors operate against a variable load factor, it is impossible to match correctly the dry fluid drive to the conveyor for the continually changing nature of the load. Consequently, under many loading conditions of the conveyor, the soft start characteristics of the system are lost. Second, maintenance of the dry fluid drive is troublesome. Because steel shot is used, environmental conditions can affect the shot adversely. Rusting is a particularly troublesome and recurrent problem. Rusting in turn permits the shot to powder over a period of time. These factors, among others, have meant that dry fluid drives require high maintenance expenditures, in both time and money. Postal applications require a drive that is adjustable to compensate for various load conditions, thereby providing the desired soft start characteristics, but that is unencumbered by the dry fluid drive deficiencies.

Electromechanical clutches also are well known in the art. In general, these devices include a first and second member which are separated from one another in the disengaged or off position of the clutch. Upon activation, electrical energy is applied to the field of the electromechanical clutch which generates a force tending to draw the second member against the first member to initiate clutch engagement. It has been common practice to adjust the voltage applied to the field of the electromechanical clutch in order to match the clutch torque to the load.

The invention disclosed hereinafter, while utilizing an electromechanical clutch as part of the overall system, differs from prior art clutch designs in a number of material aspects. As later described, the first and second members of the clutch are continuously engaged, regardless of whether or not electrical energy is supplied to the field winding. This condition is known in the art, and is defined for the purposes of this specification, as zero air gap. The facing material of one of the first and second clutch members which, as indicated, always are in contact with one another, is a low coefficient of friction material, which permits relative rotation of the first and second clutch members. Electrical control means is provided for controlling the application of electrical energy to the clutch. Initial voltage applied to the clutch is adjustable, so that the accelerating torque of the system can be adjusted to match the load. The circuit further, however, automatically applies a second, higher voltage to the clutch so that the clutch field is energized first by an accelerating voltage and subsequently by a running voltage. Running voltage for the clutch is chosen so that the breakdown torque of the clutch is higher than the breakdown torque of the associated dynamoelectric drive means, for example, a three phase electric motor. Such motors generally have overload protection means associated with them. Because clutch breakdown torque is higher than motor breakdown torque, the overload protection means for the motor will trip before the clutch of my invention overloads.

One of the objects of this invention is to provide an improved soft start drive system.

Another object of this invention is to provide a soft start drive system including a clutch having zero air gap between the rotating members of the clutch in all positions of the rotating members.

Yet another object of this invention is to provide a clutch, at least one member of which includes a face constructed from a low coefficient of friction material which permits relative rotation of the clutch members during the system start-up.

Another object of this invention is to provide control means for applying electrical energy to an electromechanical clutch of a drive system which includes means for supplying an adjustable first voltage to the field of the clutch for permitting adjustment of the soft start characteristics of drive system to a variety of load conditions.

Yet another object of this invention is to provide control means for applying electrical energy to an electromechanical clutch of a drive system which includes means for supplying a second voltage to the field of the clutch after the application of a first voltage, the second voltage ensuring that the breakdown torque of the clutch will be higher than the breakdown torque of any associated dynamoelectric drive means.

Another object of this invention is to provide an electric circuit means for controlling application of voltage to an electromechanical clutch of a drive system, which circuit provides first and second voltages to the field of the clutch in accordance with a sensed condition.

Other objects of this invention will be apparent to those skilled in the art in light of the following description and accompanying drawings.

SUMMARY OF THE INVENTION

In accordance with this invention, generally stated, a soft start mechanism is provided for use between a drive means and a driven device. In the preferred embodiment, the drive means is an electric motor and the driven device is a conveyor operatively connected to the electric motor through a suitable gear means. An electromechanical clutch assembly is interconnected between the motor and the gear means. The clutch assembly includes a first member and a second member mounted for rotation. Each of the first and second members have faces which abut one another. One face of the abutting first and second members is constructed from a low coefficient of friction material, which permits relative angular movement between the first and the second members during start-up. Means for controlling electrical input to a field of the electromechanical clutch assembly includes means for providing a first variable voltage to the field upon start, and means, responsive to a predetermined condition, for providing a constant running voltage to the field. At running voltage, the breakdown torque of the clutch is higher than the breakdown torque of the motor.

BRIEF DESCRIPTION OF THE DRAWINGS

In the drawings.

FIG. 3 is a diagrammatic representation of a control circuit means which includes means for sensing a predetermined condition for controlling voltage input to the electromechanical clutch of FIG. 2;

FIG. 4 is a block diagrammatic view of a second illustrative embodiment of means for sensing a predetermined condition for controlling voltage input to the clutch of FIG. 2; and FIG. 5 is a sectional view of a prior art dry fluid drive mechanism.

DESCRIPTION OF THE PREFERRED EMBODIMENT

Figure 1:
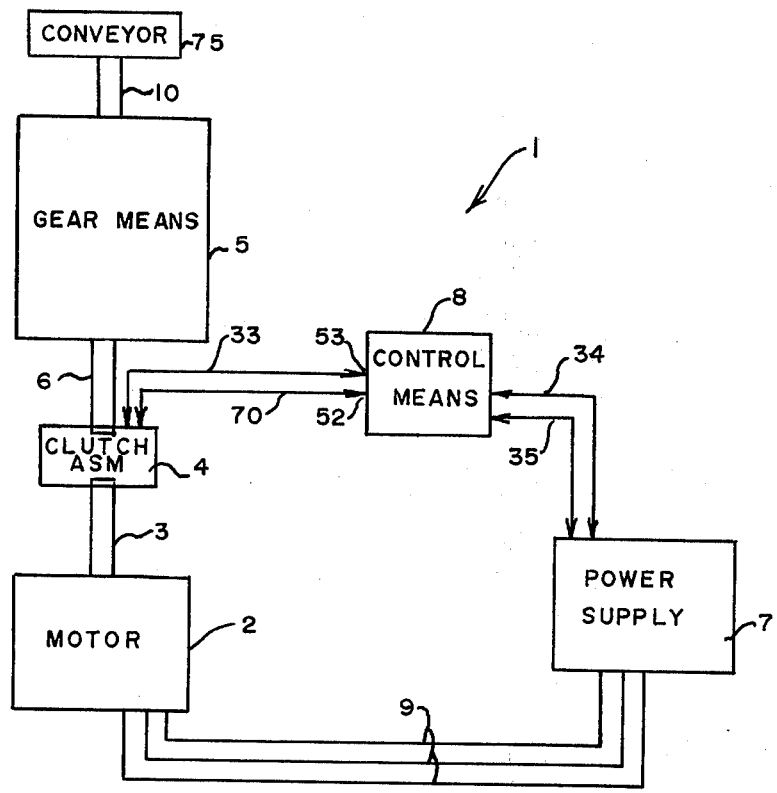
FIG. 1 is a block diagrammatic view of soft start drive mechanism of this invention.

Referring now to FIG. 1, reference numeral 1 indicates the soft start drive system of this invention. The system 1 includes a motor 2 having an output shaft 3 operatively connected to a first side of a clutch assembly 4. A second side of clutch assembly 4 is operatively connected to a gear means 5 by a shaft 6. A power supply 7 supplies input power both to the motor 2 and to a control means 8.

The power supply 7, the motor 2, and the gear means 5 all are conventional and are not described in detail. In general, the power supply 7 may comprise any power source delivering a three phase power input to the motor 2 along a plurality of conductors 9, and a single phase power input to the control means 8. Motor 2 is a conventional dynamoelectric machine and commonly includes a stator assembly and a rotor assembly. The rotor assembly is mounted to the shaft 3 and the shaft 3 is mounted for rotation with respect to the stator assembly. While the motor 2 is illustratively described as a three phase motor, those skilled in the art will recognize that other motor designs are compatible with the broader aspects of this invention. Gear means 5 also is conventional, and may comprise any of a variety of devices capable of reducing the relatively high rotational speed of the rotor assembly of the motor 2 to a more useful, slower speed. The gear means 5 has an output shaft 10, which may be used either directly, or through additional interconnection means, as for example, a belt and pulley arrangement, to drive a particular application. In the illustrated embodiment, the shaft 10 is used directly to power a conveyor 75 or similar device. As will be appreciated by those skilled in the art, the motor 2 and clutch assembly 4 also may be utilized directly to drive other applications without resorting to use of the gear means 5 for speed reduction.

As indicated above, it is conventional to provide overload protection for the motor 2. For example, sensors associated with the windings of the stator assembly often are utilized to detect changes of temperature in the windings caused by an overload condition, which open the motor winding from one or more of the conductors 9 and the power supply 7.

The particular structural features of my invention later described will be better understood by first reviewing a typical prior art device, shown in FIG. 5. As there illustrated and as briefly described above, a prior art dry fluid drive coupling 90 includes a housing 100 having a section 11 which is operatively connected to a motor shaft, and a section 12 connected to the shaft of a suitable gear means. The sections 11 and 12 are rotatable with respect to one another along a bearing means 80. The housing 100 defines a cavity 13 which contains a plurality of steel shot particles 14. Access means for permitting the addition of the steel shot particles 14, generally indicated by the numeral 81, communicates with the cavity 13. The section 11 has a plurality of fins 15 attached to it, which extend into the cavity 13. In operation, rotation of the section 11 will cause the fins 15 to rotate, which in turn begins compression of the particles 14. As the particles 14 begin compression, the drive force will be transmitted from the section 11, through the particles 14 and fins 15, to the section 12. The time required to compress the particles 14 provides the soft start characteristics of the drive. As set forth above, dry fluid couplings have a number of inherent disadvantages, not the least of which is the inability to match loads in a convenient manner and powdering of the steel shot particles 14.

Figure 2:
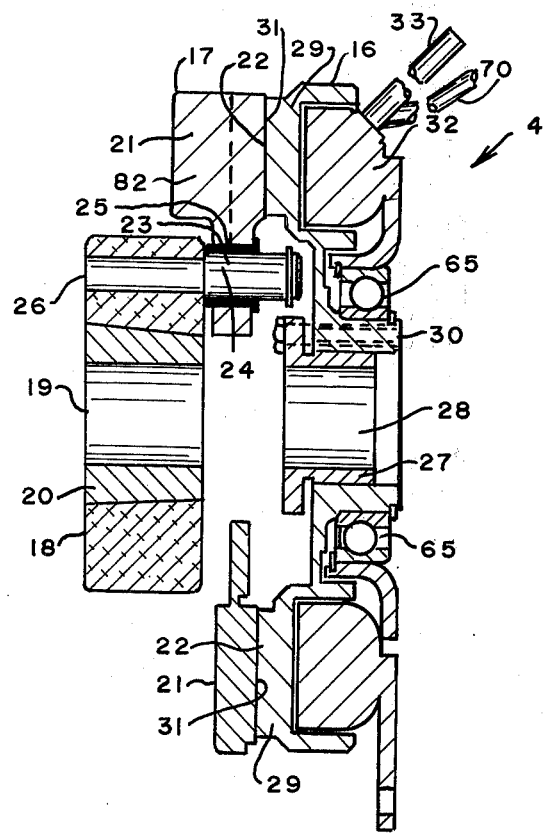
FIG. 2 is a sectional view of one illustrative embodiment of electromechanical clutch assembly used in the drive mechanism of FIG. 1.

Referring now to FIG. 2, the clutch assembly of this invention has a first member 16 and a second member 17 arranged to permit one member to drive the other. The member 17 includes a hub 18 having a central opening 19 through it. The hub 18 is intended to receive the motor output shaft 3 along a tapered lock bushing 20. Various forms of lock bushing 20 are known in the art. In general, they permit the mounting of a part on a shaft in a tight, press fit, without the need for set screws or other locking devices.

An armature 21 conventionally is constructed from magnetic material and defines the primary magnetic path for the clutch assembly 4. Armature 21 is attached to, and is rotatable with, the hub 18. The armature 21 includes a body 82 having a face 22. Face 22 is described in greater detail hereinafter.

The body 82 of armature 21 has at least one opening 23 through it, which receives a clip and spring means 24 along a bushing 25. The hub 18 has an opening 26 through it which is aligned axially with the opening 23, permitting access to the spring and clip means 24. The spring and clip means 24 functions to bias the members 16 and 17 against one another so that the clutch assembly 4 has zero air gap. That is, the face 22 of armature 21 and a face 31 of a rotor 29 abut one another in all positions of the clutch assembly 4. The opening 26 permits the disengagement of the members 16 and 17 by granting access to the spring and clip means 24. Means 24 includes a conventional coil compression spring, not shown, which is biased in a manner so as to force the members 16 and 17 into abuttment with one another along the faces 22, 31.

The member 16 includes a central hub 27 having an axial opening 28 through it. In the embodiment illustrated, the openings 28 and 19 are axially aligned, and the opening 28 is intended to receive the shaft 6 of the gear means 5. The member 16 includes the rotor 29, which is mounted to the hub 27 by any convenient method. Conventional threaded fasteners, indicated generally by the numeral 30, work well. The hub 27 and rotor 29 are mounted for rotation about a bearing means 65. Bearing means 65 is conventional and is not described in detail. The face 31 of the rotor 29 is coextensive with the face 22 of the armature 21 and the faces 31 and 22 abut one another regardless of whether or not the drive system 1 is energized. A field winding 32 is positioned in close proximity to the rotor 29 in a conventional manner. The winding 32, while important in the operation of the clutch assembly 4, does not have inventive features associated with it, and is not described in detail. The winding 32 conventionally comprises a plurality of turns of magnet wire arranged in a predetermined configuration. Both the number of wire turns and the configuration may be changed in various embodiments of this invention. The field 32 is connected to a source of electrical energy along a pair of electrical conductors indicated generally by the numerals 33 and 70, respectively.

Operation of the clutch assembly 4 is conventional in that application of electrical energy to the field 32 creates and electromagnetic effect within the rotor 29, which tends to draw the armature 21 against the rotor 29. Since the armature 21 is rotating under the power of the motor 2, the rotation is effectively coupled from the motor shaft 3 to the shaft 6 of the gear means 5.

The construction of the clutch assembly 4 is different from prior art designs in several material aspects. First, the faces 22 and 31 always are in abuttment with one another because of the use of the spring and clip means 24. That is, the spring and clip means 24 is provided so that the members 16 and 17 are continually spring biased against one another, along the faces 22 and 31. Besides providing zero air gap in all positions of the clutch, use of the spring and clip means 24 gives an automatic wear adjustment feature to the clutch assembly 4. That is to say, the members 16 and 17 are biased against one another continuously regardless of the amount of wear in the material from which the faces 22 and 31 are constructed.

The clutch facing material, of at least one of the faces 22 and 31, itself is different from prior art designs. In the prior art, the clutch facing material generally is a high coefficient of friction material which enables the clutch members to engage one another in a positive manner. The clutch facing material, for example, used for the face 22 of the clutch assembly 4 of this invention, however, is intended to be of a type which provides slip characteristics. Restated, the clutch facing material of at least one of the faces 22 and 31 is intended to permit relative rotation between the members 16 and 17. Toward that end, the material preferably is heavily carbon impregnated so that the coefficient of friction for the material at 40° C. (Celsius) will be in a range between approximately 0.198 and 0.242.

While coefficients of friction slightly above or below the desired range may work, values greatly above or below the range given either make stopping the relative rotation between the members 16 and 17 difficult when the coefficient of friction is low, or do not permit sufficient relative rotation between the members 16 and 17 during a system start-up when the coefficient of friction is high.

Referring now to FIG. 3, it may be seen that control means 8 receives an AC input along a pair of input terminals 37 and 41, respectively. The single phase input is indicated, in FIG. 1, as eminating from the power supply 7, although other voltage sources may be utilized, if desired.

A conductor 34 has a fuse 36 electrically connected in it between the terminal 37 and an AC node 38 of a full wave bridge rectifier 39. A conductor 35 is connected between a second AC node 40 of the bridge 39 and the terminal 41. A surge suppressor 62 is electrically connected between the conductors 34 and 35. Surge suppressor 62 give both a voltage clamp and current suppressor features to the control means 8.

Bridge 39 is conventional and includes a pair of DC output nodes 42 and 43. Legs 44, 45, 46, and 47 are connected between respective pairs of nodes 38, 40, 42, and 43. Each of the legs has diode 48 electrically connected in a conventional manner to provide a full wave rectified DC output at the nodes 42, 43, from the AC input.

A conductor 51 is connected between the node 43 and a series circuit including a potentiometer 49 and a resistor 50. The resistor 50 is connected, via a conductor 63, to an output terminal 52 of the control means 8. Output terminal 52 is electrically connected to a first side of the field winding 32 by the conductor 70. A second side of the field winding 32 is electrically connected by the conductor 33 to an output terminal 53 of the control means 8. The terminal 53 is electrically connected to the node 42 of the bridge 39 by a conductor 54. A time delay means 55 is connected across the potentiometer 49 and the resistor 50 at a pair of connection points 58 and 64, respectively. The time delay means 55 preferably is a solid state timer which includes a switch 56. The switch 56 is an open circuit for a predetermined time period. Upon expiration of the predetermined time period, the switch 56 closes. Closure of the switch 56 short-circuits the potentiometer 49 and the resistor 50 so that the full output voltage of the bridge 39 appears across the terminals 52 and 53. Prior to closure of the switch 56, the potentiometer 49 permits variation of the voltage appearing between the terminals 52 and 53.

Operation of the system 1 is relatively simple. When activation of the motor 2 is desired, the power supply 7 is enabled and supplies power both to the motor 2 and to the control means 8. The motor 2, starting from rest, will begin to accelerate. As the motor 2 accelerates, it rotates the hub 18 and the armature 21 of the member 17. Because of the low coefficient of friction between the faces 22 and 31, some relative rotation slippage movement occurs between the members 16 and 17, even though the faces 22 and 31 abut one another. The power supply 7 also supplies an AC input to the control means 8. The AC input is rectified by the bridge 39 and the DC output of the bridge 39 will flow through the potentiometer 49 and the resistor 50 along the conductor 63 to the field winding 32 of the clutch assembly 4. As indicated, the initial DC output of the control means 8, that is, the output when the switch 56 is open, may be varied by the potentiometer 49. In one embodiment of my invention, the bridge 39 is designed to have an output voltage of 90 volts DC. The resistors 49 and 50 are utilized to divide the 90 volt output across clutch terminals 52 and 53 into a range variable between 10 and 60 volts DC. Voltages within this range may be selected by manipulation of the potentiometer 49. Consequently, voltage applied to the field winding 32 may be adjusted easily to match the starting characteristics of the clutch assembly 4 with the load of the conveyor 75. That is, the electromotive force generated by the field winding 32 can be varied. This in turn will increase or decrease the amount of slippage permitted between the members 16 and 17, varying the accelerating time when the conveyor 75 is started.

After a predetermined time period, the time delay 55 is actuated automatically. Time delay 55 includes the normally open switch 56. After the expiration of a predetermined time period, which is sufficient to permit both the motor 2 and conveyor 75 to reach operating speeds, the switch 56 closes, short-circuiting the potentiometer 49 and resistor 50, and applying the full voltage of the bridge 39 at the terminals 52 and 53. With full bridge voltage applied to the field winding 32, the winding 32 generates maximum electromotive force, locking the members 16 and 17 tightly together. In the embodiment illustrated, the motor 2 is a 7.5 horsepower, three phase motor. With 90 volts applied to the field winding 32, the breakdown torque of the clutch assembly 4 is greater than the breakdown torque of the motor 2. If the clutch assembly 4 thereafter becomes overloaded for any reason, the motor 2 necessarily will reach its breakdown torque before the clutch assembly 4, tripping any associated motor protector before damage to the clutch assembly 4 results. It is thus evident that the control means 8 provides a dual voltage output, one of the voltage outputs being adjustable between predetermined limits, and the second output having a constant value at least as great as the upper limit of the range of the first voltage output.

A second method for removing the potentiometer 49 and resistor 50 from the circuit of the control means 8 is illustrated in FIG. 4. As there shown, the switch 56 still is connected across the potentiometer 49 and resistor 50 at the point 64 and the point 58. The switch 56 in this embodiment, however, is actuated by a magnetic pick-up means 59, operatively associated with a sprocket 60. The sprocket 60 may comprise any of a variety of commercially availabe devices. In general, the sprocket 60 is mounted for rotation with the motor shaft 3 and includes a plurality of teeth 61. The pick-up means 59 is mounted in the motor 2 so as to enable it to detect the passage of the teeth 61. Those skilled in the art will recognize that the pick-up means 59 may be utilized to generate a voltage which is dependent upon the number of teeth 61 passing the pick-up means 59. This in turn, will be dependent upon the speed of the motor 2. Consequently, as the motor 2 reaches operating speed, the pick-up means 59 will generate a voltage which enables the normally open switch 56 to close, short-circuiting the potentiometer 49 and resistor 50, and applying the full bridge voltage to the field winding 32. Operation of the system utilizing the pick-up means 59 in other aspects is substantially as described in conjunction with the embodiment of FIGS. 1 and 3.

In the alternative, the time delay 55 may be eliminated from the circuit of FIG. 3. When this occurs, the breakdown torque of the clutch assembly 4 will be less than the breakdown torque of the motor 2. It is conventional to use some form of starting switch in conjunction with the power supply 7 for initiating motor 2 on time. The starting switch circuit generally includes a contactor or starter coil which must be energized electrically if power is to be supplied to the motor 2. By mounting the sprocket 60 for rotation with the shaft 6, the switch 56 and magnetic pick-up means 59 may be electrically connected to the contactor or starter coil. As indicated, in this embodiment, the breakdown torque of the clutch assembly 4 is less than the breakdown torque of the motor 2. Consequently, the clutch assembly 4 will slip if an overload condition occurs. As the clutch assembly 4 slips, the voltage signal from the magnetic pick-up means 59 decreases, opening the switch 56. Since the switch 56 is connected to the contactor or starter coil, opening of the switch 56 disables the contactor or starter coil, thereby removing power input to the motor 2.

From the foregoing, it may be seen that this invention is one well adapted to obtain all the ends and objects herein set forth, together with other advantages which are obvious from the structure. It will also be understood that certain features and subcombinations are of utility and may be employed without reference to other features and subcombinations.

Numerous variations, within the scope of the appended claims, will occur to those skilled in the art in light of the foregoing description and accompanying drawings. Thus, the design of various mechanical and electrical features of the clutch assembly 4 may be varied in other embodiments of this invention. For example, the field winding 32 may be varied as required to meet applicational requirements. Likewise, the enclosure and various mechanical features may be altered as applications require. Other methods for applying the dual voltages from the control means 8 to the field winding 32 will occur to those skilled in the art. The voltage values and the voltage range of the control means 8 may vary in other embodiments of this invention. While various connection points were illustratively described as "nodes", those skilled in the art will recognize that the diagrammatic illustration of a connection node or point merely facilitates the description of the circuit diagram under consideration, and that individual nodes or points may be combined into single connection points and need not appear as actual nodes in embodiments of this invention. The drive system of this invention may be used in conjunction with a wide variety of motor types having various horsepower ratings. These variations are merely illustrative.

Having thus described the invention what is claimed and desired to be secured by letters patent is:

1. In a drive system operatively connected to a conveyor, including gear means operatively connected to said conveyor, and a drive motor adapted to drive said conveyor through said gear means, the improvement which comprises means for providing a soft start to said conveyor upon activation of said drive motor, said soft start providing means being operatively connected between said motor and said gear means, including a clutch assembly having a first member connected to said motor and a second member connected to said gear means, clutch facing means between said first and said second members, said clutch facing means being constructed from a material having a coefficient of friction at 40° C. chosen from a range between 0.198–0.242, said clutch facing material permitting relative rotation of said first and said second members upon activation of said drive motor, means for maintaining said first and said second members in abutment with one another along said clutch facing means, electrical means for increasing the force between said first and said second clutch members, and electric circuit means for varying the voltage applied to said electrical force increasing means between at least a first level and a second higher level during energization of said drive motor.

2. The improvement of claim 1 wherein said electric circuit voltage varying means comprises a potentiometer electrically connected to said electrical force increasing means, switch means electrically connected to said potentiometer for removing said potentiometer electrically from the circuit of said electric circuit voltage varying means, and means responsive to a predetermined condition for actuating said switch means.

3. The improvement of claim 2 wherein said predetermined condition responsive means comprises time delay means for actuating said switch after the expiration of a predetermined elapsed time period.

4. The improvement of claim 3 wherein said means for maintaining said first and said second members in abutment comprises spring means interconnected between said first and said second members for exerting a biasing force on said first and said second members toward abutment.

5. The improvement of claim 4 wherein the breakdown torque of said electromechanical clutch assembly at said second higher voltage level is greater than the breakdown torque of said drive motor.

6. The improvement of claim 2 wherein said predetermined condition responsive means comprises means responsive to the speed of said drive motor for controlling operation of said switch means.

* * * * *